June 30, 1925.
C. SPAETH
HAND TRUCK
Filed May 12, 1924
2 Sheets-Sheet 1
1,544,356
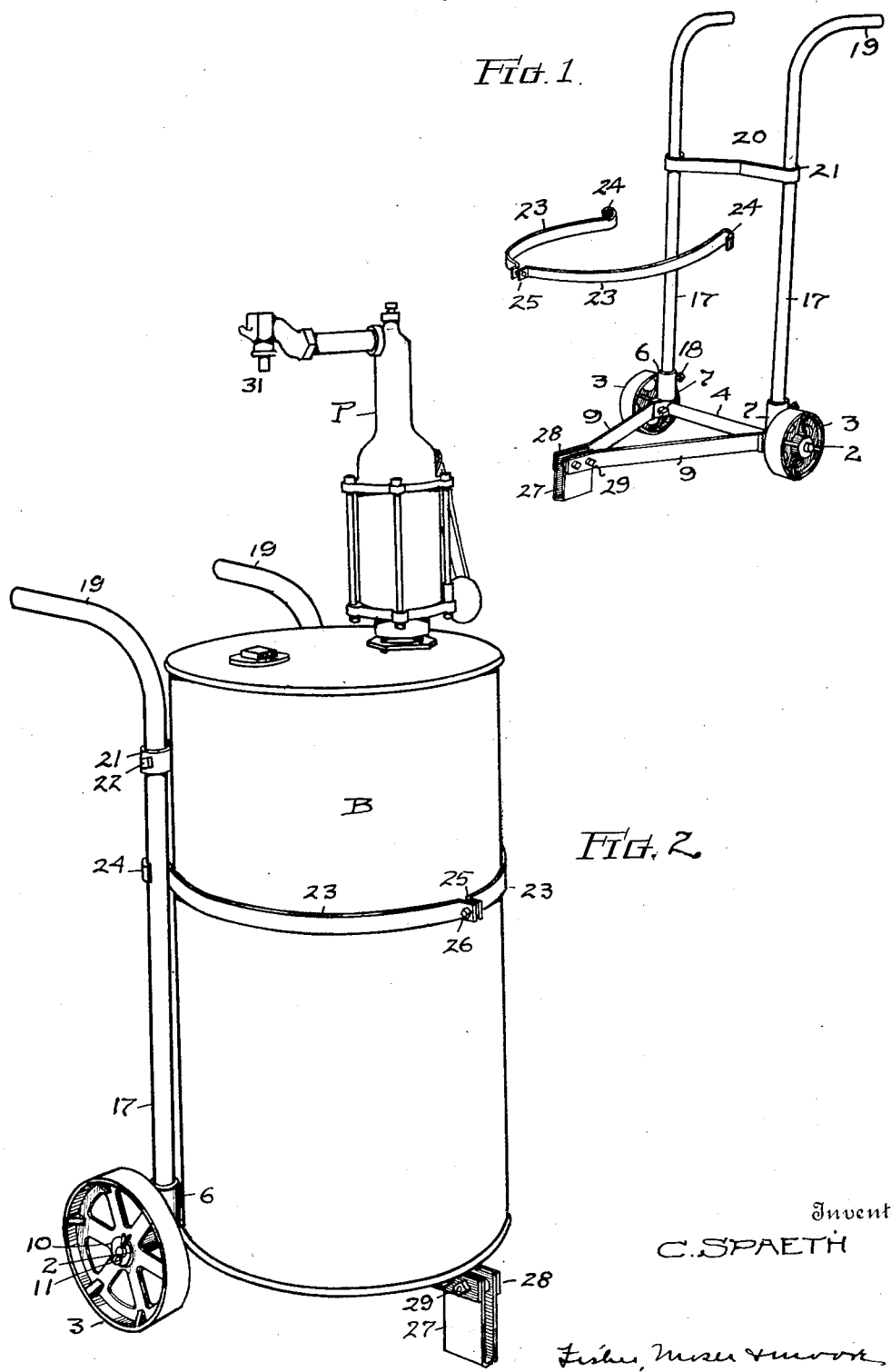
Inventor
C. SPAETH June 30, 1925. 1,544,356
C. SPAETH
HAND TRUCK
Filed May 12, 1924   2 Sheets-Sheet 2
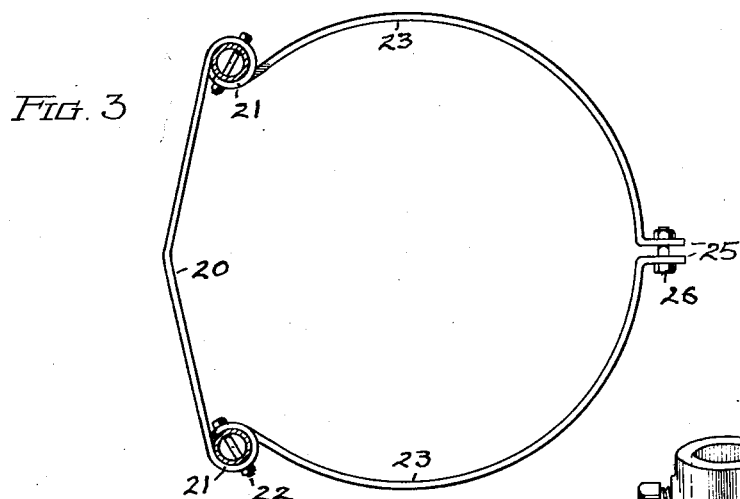
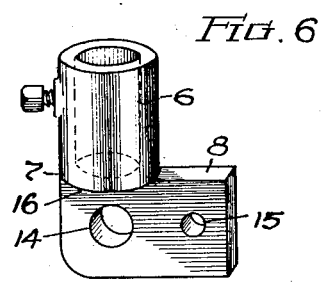
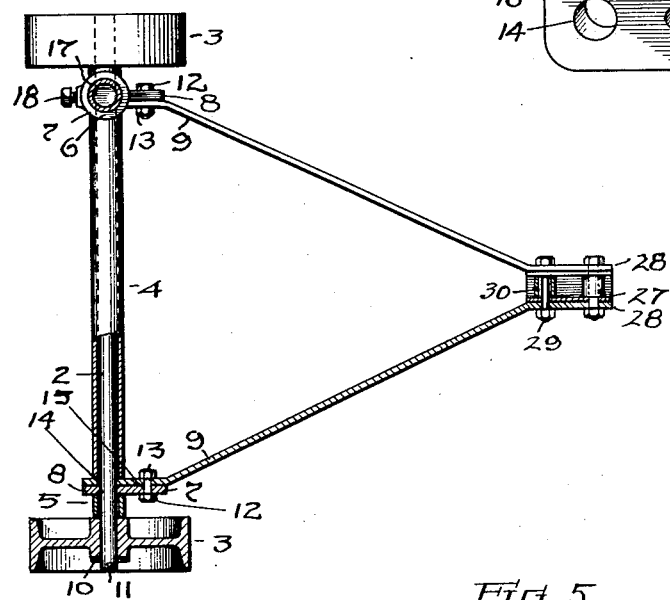
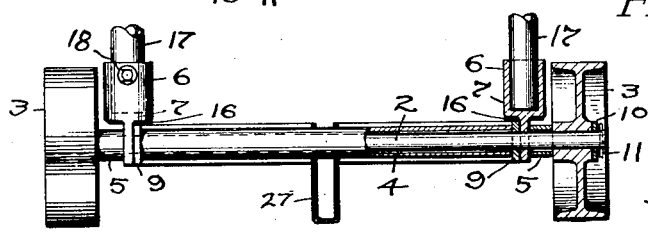
Inventor
C. SPAETH Patented June 30, 1925.

1,544,356

UNITED STATES PATENT OFFICE.

CHARLES SPAETH, OF CLEVELAND, OHIO, ASSIGNOR TO THE MARVEL EQUIPMENT COMPANY, OF CLEVELAND, OHIO, A CORPORATION OF OHIO.

HAND TRUCK.

Application filed May 12, 1924. Serial No. 712,620.

*To all whom it may concern:*

Be it known that I, CHARLES SPAETH, a citizen of the United States, residing at Cleveland, in the county of Cuyahoga and State of Ohio, have invented certain new and useful Improvements in Hand Trucks, of which the following is a specification.

My invention relates to an improvement in a hand truck, and the device is particularly constructed to support and transport barrels, drums and similar receptacles containing or carrying pumping and dispensing apparatus, for example, portable oil and grease dispensing outfits, such as commonly used in automobile garages and filling stations. Such outfits generally comprise hand pumps mounted upon the top of a shipping barrel or storage drum, and the truck is usually arranged to support such outfits in an upright position with the pump at a convenient operating and dispensing level, and the complete outfit is also adapted to be readily tilted and trundled from place to place. My object is to provide an exceptionally simple construction of truck adapted to support an oil and grease dispensing outfit in a stable but removable position thereon, and to make the truck of a minimum number of parts and in such a way that these parts may be cheaply produced and readily assembled to form a rigid and durable structure at small cost and expense.

In the accompanying drawings, Fig. 1 is a perspective view of my improved truck showing the retaining band for the drum or receptacle detached from the handles. Fig. 2 is a larger perspective view than Fig. 1, of the same truck with a dispensing drum and pump mounted and clamped thereon. Fig. 3 is a cross sectional view of the two handles and a top view of the connecting brace and the divided clamping or retaining band. Fig. 4 is a top view of the base part of the truck, showing the tubular handles and portions of the base members in section. Fig. 5 is a rear elevation, partly in section, of the base part of the truck. Fig. 6 is a perspective view of one of the coupling members for the handles and base frame of the truck.

The truck comprises a round axle 2 upon the opposite ends of which two cast-iron wheels 3—3 are rotatably mounted. These wheels are held in definitely spaced relation on the shaft by a long piece of metal tubing or pipe 4, two shorter sections of pipe or sleeves 5—5, two flattened coupling members 7—7, and two flat bars 9—9 which form the side members of a triangular base frame for the truck. A pair of washers 10 are sleeved over the ends of axle 2 outside of the wheel-hubs, and removable cotter pins 11 extend through holes in the axle and hold the assembled parts together. Wheels 3—3 are free to rotate independently on the axle, and the coupling members 7—7 pivot or turn on the axle together with bars 9—9, each bar 9 and the adjacent coupling member 7 being secured together by a single bolt 12 and nut 13. Thus, each bar 9 has a flat extremity which is formed with two spaced openings, one to receive axle 2 and the other to receive bolt 12, and each coupling member has an angular foot portion 8 with flat vertical faces in which two openings 14 and 15 are spaced apart to also receive axle 2 and bolt 12 when bar 9 and the flat portion 8 are brought together with their respective shaft openings and bolt openings in register, see Fig. 4. The axle co-acts with bolts 12 to rigidly unite the coupling members 7 with the bars 9 which are bent to come together at their front ends to form a triangular base upon which a barrel or drum B may be supported, and additional rigidity is obtained between bars 9 and the coupling members by extending the bars underneath and in edge engagement with the flat overhang or shoulder 16 of the vertical round socket portion 6 of coupling member 7, see Figs. 5 and 6. Socket portions 6 are adapted to receive round tubular handles 17—17 which may be locked therein by suitable set screws 18, and the upper ends of the tubular handles may be bent rearwardly to provide suitable hand grips 19. A flat metal bar 20 bent rearwardly at its middle has end loops 21 sleeved over the round handles and secured thereto by pins or bolts 22, and this bar serves as a cross brace for the handles and also as an offset back rest for a round drum or receptacle B. The drum is also clamped to the handles to permit the drum and truck to be readily handled as a portable unit, and in order that the drum may be replaced I provide two similar straps 23—23 bent into circular shape, each having a hook-shaped extremity 24 adapted to clasp the round handle, and each being also formed with an angular extremity 25 having a bolt opening to receive a clamping bolt 26 when the straps encircle the drum and are brought together in front thereof as delineated in Fig. 2.

A foot rest is also provided at the front of the triangular base frame by fastening a U-shaped piece 27 of sheet metal between the parallel front end portions 28 of bars 9, using one or more clamping bolts 29 and spacing sleeves 30 for that purpose. In this way the drum may be supported in a stable upright position to permit pump P to be operated and the oil or grease dispensed through delivery spout 31 into a vessel placed on top of the drum or held beneath the spout. Tilting of the drum may be easily effected by grasping the handles, and when tilted the outfit may be readily wheeled over the floor as desired. No rivets or permanent connections are used in uniting the several parts of the truck together, and the details of structure as described herein permit a minimum number of fastening members to be used with very rigid effect, and therefore the work and labor of assemblying the parts is greatly simplified, the cost of production and assembly is also greatly reduced, and a very satisfactory, durable truck may be furnished to the public at a low cost.

What I regard as my invention and discovery and desire to claim, is:

1. A hand truck, comprising a round axle, wheels mounted upon the ends of said axle, a pair of angular coupling members sleeved upon said axle, said coupling members having sockets, tubular handles secured within said sockets, and a pair of flat bars bolted to said members bent on converging lines and connected at their outer ends to each other and to a depending foot member.

2. A hand truck, comprising a round axle and wheels, a pair of angular members rotatably coupled with said axle at the sides of said wheels, said members having tubular sockets and flat extensions, tubular handles secured within said sockets, a base frame composed of two converging bars having a rest member secured thereto at their front converging ends, and the flat extensions of said angular members and the rear ends of said bars each having a pair of registering openings adapted to receive said axle together with supplemental means adapted to unite said angular members and bars facially together.

3. A hand truck, comprising a round axle, wheels for said axle, a pair of angular coupling members rotatably sleeved upon said axle, each member comprising a vertical socket and a horizontal extension, round tubular handles secured within said sockets, flat bars connected with the axle and secured to said extensions and bent towards each other to provide a base at the front of said handles, a rest member secured between the outer meeting ends of said bars, and a tubular spacing member sleeved upon said axle between said coupling members.

4. A hand truck, comprising a round axle having wheels, angular coupling members having flat horizontal arms provided with separate spaced axle openings and bolt openings, a base frame composed of bars having axle openings and bolt openings adapted to register with the openings in said arms, said arms being bent toward each other and spaced apart parallely at their outer ends, bolts for said bolt openings, a rest member secured to and between the parallel outer ends of said arms, spacing means on said axle for said coupling members, and a pair of handles affixed to said coupling members.

5. A hand truck, comprising a round axle, a pair of wheels rotatably sleeved upon said axle, a pair of angular coupling members rotatably secured to said axle, a spacing tube sleeved upon said axle between said coupling members, a triangular base frame formed by a pair of bars and said axle, the outer ends of the bars being connected and projected forwardly to provide a foot rest, said bars and coupling members being secured together for joint rotation upon said axle, a pair of handles secured to said coupling members, and a brace connection between said handles.

In testimony whereof I affix my signature.

CHARLES SPAETH.